United States Patent [19]
Christensen et al.

[11] 3,979,062
[45] Sept. 7, 1976

[54] PERIPHERAL WATER BALANCE CONTROL FOR CENTER PIVOT IRRIGATION SYSTEM

[75] Inventors: Dale A. Christensen; Carl R. Ostrom, both of Omaha; Ronald L. Frankenstein, Fremont, all of Nebr.

[73] Assignee: Valmont Industries, Inc., Valley, Nebr.

[22] Filed: Nov. 26, 1975

[21] Appl. No.: 635,278

[52] U.S. Cl. ............................. 239/11; 239/177; 137/344
[51] Int. Cl.² ........................ B05B 17/04; B05B 3/18
[58] Field of Search ............ 239/177, 212, 163–166, 239/76, 11; 137/344

[56] References Cited
UNITED STATES PATENTS

| | | | |
|---|---|---|---|
| 3,111,268 | 11/1963 | Butler | 239/164 X |
| 3,703,990 | 11/1972 | Erickson | 239/11 |
| 3,750,953 | 8/1973 | Reinke | 239/177 |
| 3,802,627 | 4/1974 | Seckler et al. | 137/344 X |
| 3,901,442 | 8/1975 | Chapman | 239/177 X |
| 3,902,668 | 9/1975 | Dougherty et al. | 239/177 |

FOREIGN PATENTS OR APPLICATIONS

1,032,444   6/1966   United Kingdom ................. 239/212

*Primary Examiner*—Robert S. Ward, Jr.
*Attorney, Agent, or Firm*—Kinzer, Plyer, Dorn & McEachran

[57] ABSTRACT

A water balance control for a pivotal end boom connected to the outer end of a center pivot irrigation system to irrigate peripheral areas (e.g., corners) beyond the periphery of the circular area covered by the main conduit of the system; the water balance control comprises a sensing mechanism for sensing both the angular position of the boom and its direction of movement (swing-out or swing-in) relative to the end of the main conduit. Primary control circuits, actuated by the sensing mechanism, turn the boom nozzles on and off, depending on the angular position of the boom; secondary control circuits, also actuated by the sensing mechanism, operate the primary controls in accordance with two different programs, one for swing-out movement and the other for swing-in movement. A speed control for the main conduit, also actuated by the sensing mechanism, is included.

18 Claims, 10 Drawing Figures fig.7.

PERIPHERAL WATER BALANCE CONTROL FOR CENTER PIVOT IRRIGATION SYSTEM

BACKGROUND OF THE INVENTION

Center pivot irrigation systems, of which Zybach U.S. Pat. No. 2,941,727 is a relatively early example, are widely used for irrigation of large agricultural areas. The lengths of commercial systems of this kind range from about 200 feet to over 1800 feet. In any such system, because the central portion of the radially extending main conduit moves much more slowly than the outer portion, it is necessary and customary to provide for a substantially larger discharge of water at the outer end of the system than at the inner end. Typically, this control is exercised by a gradation of the orifice sizes for the sprinklers or discharge nozzles, using small discharge orifices at the inner portion of the system and substantially larger orifices at the outer end. Another water balance technique that has been applied to basic center pivot irrigation systems entails programmed time control for discharge nozzles of uniform size; a water balance control of this particular kind is disclosed in Chapman U.S. Pat. No. 3,901,422.

The conventional center pivot irrigation system covers a circular area; in a rectangular field, the corners are not irrigated. For a number of years, it has been customary to irrigate a part of the corner areas by means of a large high volume long distance discharge nozzle called an end gun. The end gun is maintained inoperative as the system sweeps past those parts of the field where the arc described by the outer end of the pivoting main conduit approaches relatively close to the edges of the field. The end gun is operated for limited arcuate segments of movement of the system that are aligned with the corners. The end gun is usually turned on and off by a relatively simple circular cam mounted at the central pivot, with adjustable cam members to determine the arcuate limitations for the system at which the end gun is actuated.

More recently, center pivot irrigation systems have been provided with an auxiliary conduit that is pivotally mounted to the outer end of the main conduit. The auxiliary conduit, sometimes called a boom, is held at an angle of close to 90° to the main conduit and is maintained essentially inactive during those intervals in which the outer end of the main conduit is moving closely adjacent the edge of the area to be irrigated. In irrigating the corners of a rectangular field, or in irrigating other areas, in which a part of the area is located beyond the arc described by the end of the main conduit, the auxiliary conduit is pivoted outwardly to an angle of greater than 90° and water is discharged through the auxiliary conduit to irrigate an additional area beyond the boundary of the area that would normally be covered by the system. An early example of this more recent type of center pivot irrigation system is described in Seckler et al. U.S. Pat. No. 3,802,627. Controls for directing the movements of the auxiliary conduit or boom are described in Kircher et al. U.S. Pat. No. 3,797,517 and in Daugherty et al U.S. Pat. No. 3,902,668. The Daugherty et al patent is particularly advantageous, as regards a steering system for the auxiliary conduit boom, because it allows for ready and effective avoidance of obstructions and for the irrigation of peripheral areas of widely varying configuration.

The addition of a pivotal auxiliary conduit at the outer end of a conventional center pivot irrigation system, however, introduces substantial problems with respect to maintenance of water balance in the areas irrigated both by the main conduit and the auxiliary conduit. In particular, the area covered by the auxiliary conduit as it swings outwardly from a first angular alignment to a second angular alignment relative to the end of the boom is substantially different from the area that must be irrigated by the same auxiliary conduit as it swings inwardly through the same angular distance. Furthermore, the differences between the two areas vary in dependence upon the direction in which the main conduit rotates, as compared with the direction in which the auxiliary conduit extends from the main conduit. Finally, with an auxiliary conduit of any substantial length, an increased discharge from the auxiliary conduit produces a reduced discharge from the main conduit as the result of the pressure/discharge characteristics of the pumps ordinarily used to supply water to systems of this general kind, necessitating a system speed adjustment to maintain adequate water balance in the area covered by the main conduit.

SUMMARY OF THE INVENTION

It is a principal object of the invention, therefore, to provide a new and improved water balance control for a center pivot irrigation system of the kind equipped with a pivotally movable auxiliary conduit extension employed to irrigate areas beyond the periphery of the main conduit of the system.

Another object of the invention is to provide a new and improved water balance control for an auxiliary conduit extension on a center pivot irrigation system, which control effectively compensates for the differences in the areas covered by the auxiliary conduit in swing-out and swing-in movements relative to the outer end of the main conduit.

Another object of the invention is to provide a water balance control for an auxiliary conduit extension pivotally connected to the outer end of a center pivot irrigation system that can be quickly and easily changed to correct for changes in the direction of rotational movement of the main conduit of the system, without requiring re-programming of the control.

An additional object of the invention is to provide a new and improved water balance control for a center pivot irrigation system of the kind including a rotatable main conduit with an auxiliary conduit pivotally connected to its outer end that effectively compensates for losses in pressure head in the main conduit occasioned by the discharge of water from the auxiliary conduit.

A specific object of the invention is to provide a new and improved water balance control for a pivotal auxiliary conduit extension on a center pivot irrigation system that is simple and inexpensive in construction, reliable in operation, and directly adaptable to a wide variety of systems of varying overall length.

Accordingly, the invention relates to a water balance control for a center pivot irrigation system of the kind including an elongated main conduit assembly having an inner end pivotally connected to a water source at a central pivot point and having a plurality of discharge nozzles at spaced intervals along its length, main drive means for moving the main conduit assembly around the pivot point to irrigate a primary field area of circular configuration, an elongated auxiliary conduit assembly having an inner end connected to and movable with the outer end of the main conduit assembly and having a series of discharge nozzles at spaced intervals along its length, and auxiliary drive means for moving the auxiliary conduit assembly over a range between a fully retracted position and a fully extended position, relative to the main conduit assembly, to irrigate at least one secondary field area beyond the periphery of the primary field area. The water balance control comprises sensing means for sensing movement of the auxiliary conduit assembly, within its range, relative to the outer end of the main conduit assembly, and primary control means, actuated by the sensing means, for regulating the rate of water discharge from the auxiliary conduit nozzles in accordance with the position and direction of movement of the auxiliary conduit assembly within its range.

DETAILED DESCRIPTION OF THE PREFERRED EMBODIMENTS OF THE INVENTION

Figure 1:
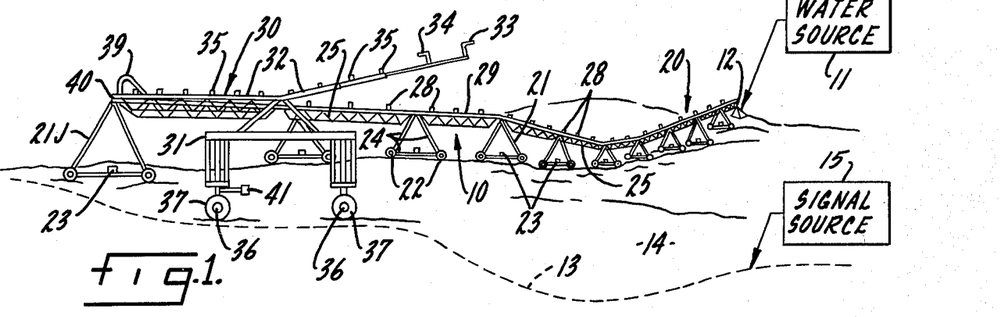
FIG. 1 is a perspective elevation view of a center pivot irrigation system of the kind in which the water balance control of the present invention may be incorporated.

FIG. 1 illustrates a center pivot irrigation system 10 constituting one example of the kind of system in which the water balance control of the present invention may be employed. System 10 includes an elongated main water conduit assembly 20 comprising a main conduit 29 having an inner end pivotally connected to a central water supply point 12 that is connected to a water source 11. Conduit 29 is supported by a plurality of self-propelled support towers 21, each including a pair of wheels 22 driven by a motor 23 mounted on the support tower framework 24. The motors 23, in the illustrated system, are preferably electric motors, but water-drive motors, other hydraulic motors, or pneumatic motors could be employed. Trusses 25 aid in support of the main water conduit 29.

Figure 2:
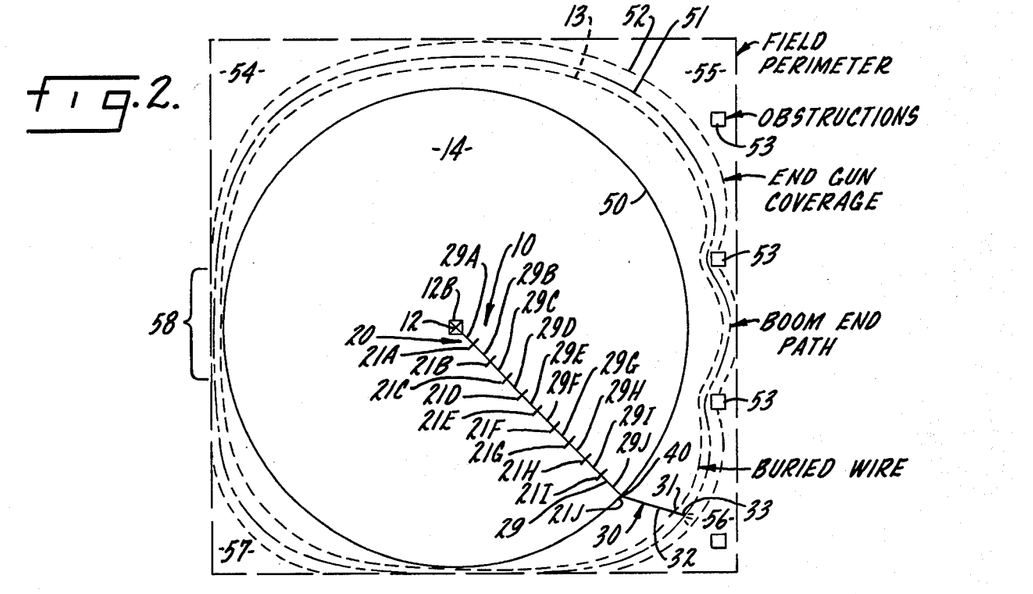
FIG. 2 is a schematic plan view of the center pivot irrigation system of FIG. 1 as employed in irrigating a field of a given configuration.

The main water conduit 29 of assembly 20 comprises a plurality of segments 29A, 29B, 29C, etc. extending out to the end segment 29J (see FIG. 2). These segments extend from the central pivot point 12 to support towers 21A, 21B, 21C, etc. up to the end support tower 21J of assembly 20. The essentially rigid conduit segments are each flexibly connected to the adjacent conduit segments at the support towers. Each of the conduit segments 29A–29J has a plurality of water discharge nozzles 28 at spaced intervals along its length.

An elongated auxiliary conduit assembly 30 is pivotally connected to the outer end of the main water conduit assembly 20, at tower 21J, by a joint 40. Assembly 30, sometimes referred to herein as a boom, includes an auxiliary water conduit 32 connected with the main water conduit 29 of assembly 20 by a connecting conduit 39. One self-propelled steerable support tower 31 is shown, for boom 30; additional support towers can be used, depending on the length of the boom. For an auxiliary conduit 32 of relatively short length, the entire boom 30 may be of cantilever construction, supported from the end tower 21J of the main conduit assembly 20.

A single or dual end gun is preferably mounted at the outer end of the auxiliary water conduit 32. A dual end gun arrangement, comprising an outer limited-angle end gun 33 and an adjacent full-circle end gun 34, is illustrated. The auxiliary conduit 32 has a series of water discharge nozzles 35 at spaced intervals along its length. End guns 33 and 34 provide for irrigation beyond the outermost end of boom 30.

As shown in FIG. 2, the main water conduit assembly 20 irrigates a circular area in a field 14 bounded by the line 50, supplying water thereto through the discharge nozzles 28 (FIG. 1). The boom support tower 31 can be controlled by an antenna 41 and suitable steering controls (not shown) so that its wheels 37 follow a guidance wire 13 buried in the periphery of field 14; wire 13 is connected to a signal source 15. Thus, the outer end of conduit 32 follows a path as defined by line 51. By controlling the end guns 33 and 34, an additional area can be covered as shown by line 52. The total area effectively irrigated by system 10 is shown by the area within line 52. This irrigated area is modified to avoid obstructions 53 and extends well into the corners 54, 55, 56 and 57 of field 14.

Movement of the main conduit assembly 20 is accomplished by main drive means comprising the motors 23 on towers 21, and appropriate motor controls, which may be generally conventional in construction and operation. The wheels 37 of the boom support tower 31 may be provided with individual drive motors 36 essentially similar to the propulsion motors 23 used for the main conduit towers 21. Constant speed motors are preferred.

When the auxiliary water conduit assembly 30 is in its fully closed or tuck position, as when system 10 traverses area 58, the motors on end support tower 21J may be driven continuously or in accordance with a fixed duty cycle. When a certain amount of deflection is sensed by a suitable sensor (not shown) at the joint above the adjacent inner support tower 21I, the motor of tower 21I is driven for a limited period to straighten out the joint. This method of control continues through adjacent segments of the main conduit assembly 20. Each inwardly displaced support tower is driven less as central point 12 is approached; the innermost support tower 21A is driven least. Strain sensors at the joints in the main conduit 29 can be used instead of deflection sensors, if desired.

The auxiliary drive means for boom 30, comprising motors 36, wheels 37, and suitable motor controls (not shown), may be activated or stopped according to a signal from a strain sensor (not shown) at the joint 40. When the main conduit assembly 20 has moved forward and created a strain at joint 40, support tower 31 is signalled to drive forward until the stress is alleviated. The sensor may also afford a complete shut off of all towers, as a safety precaution, for a given excess stress condition at joint 40.

Alternatively, the motors 36 for boom support tower 31 can be driven continuously, or in accordance with a fixed duty cycle, and the strain signal at joint 40 may be utilized to drive support tower 21J. That is, either of the towers 21J and 31 can be employed as a master tower, with the other towers following accordingly.

Figure 3:
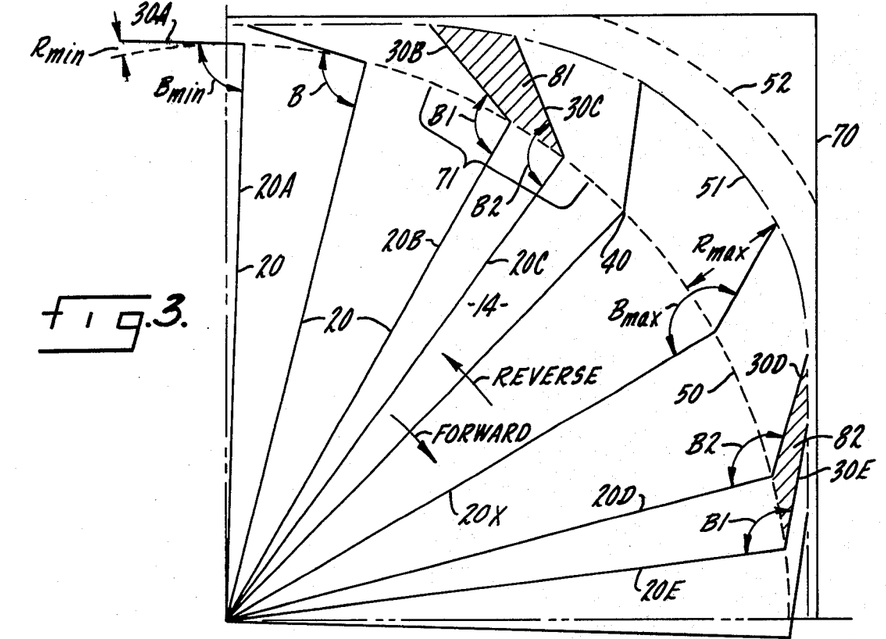
FIG. 3 is a schematic plan view of the center pivot irrigation system of FIG. 1 as applied to the irrigation of an unobstructed rectangular corner of a field.
Figure 4:
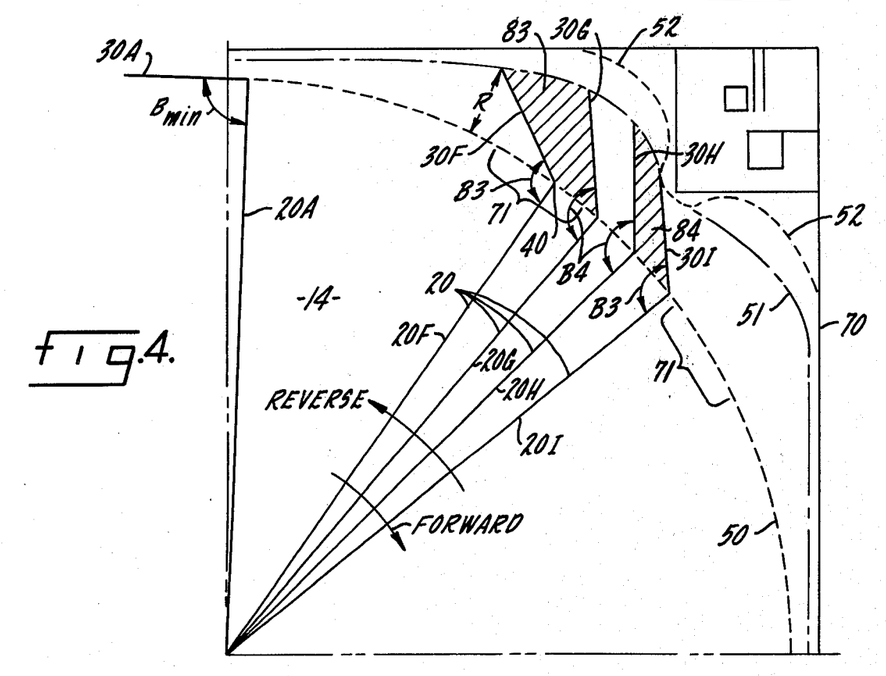
FIG. 4 is a schematic plan view similar to FIG. 3 showing the system irrigating a field corner which includes an obstruction of substantial size.

FIGS. 3 and 4 are detailed schematics showing the positions of the main conduit assembly 20 and the auxiliary conduit assembly 30 at various points during traversal of a normal square corner (FIG. 3) and an obstructed corner (FIG. 4). Each figure shows the outer circumference 50 of the travel of the main conduit assembly 20. The path 51 followed by the outer end of the boom 30 is also shown; the maximum coverage of irrigation is illustrated in each figure by line 52. The outer limit of the field in each figure is shown by line 70. Boom 30 describes an angle $B_{min}$ of approximately 90° with respect to the main conduit assembly 20 at the maximum closed or tuck positions, 20A, 30A. The maximum angle $B_{max}$ is preferably about 160°. In the areas 71, the auxiliary conduit assembly 30 is not swung out as rapidly as possible; this is done to assure adequate water distribution uniformity. The smoother the curves formed by path 51, the less the stress on joint 40.

In a preferred mode of operation, end support tower 21J is the master drive unit for the system 10. Tower 21J is driven in accordance with a fixed duty cycle dependent upon the water requirements of the field (this may be a continuous duty cycle, when boom 30 is not swung out) and is driven in accordance with a reduced duty cycle while boom 30 is extended. This allows a reduced rate of travel for tower 21J when aligned with the corner of a field, or in another area where boom 30 is extended, while still permitting use of an inexpensive constant-speed motor for the tower. Conversely, as noted above, the boom tower 31 may be used as the master drive unit instead of tower 21J.

The center pivot irrigation system 10, as thus far described, corresponds basically to the system set forth in Seckler et al. U.S. Pat. No. 3,802,627, modified to include the buried wire steering system for the auxiliary conduit assembly 30 that is disclosed in Daugherty et al. U.S. Pat. No. 3,902,668. The water balance control of the present invention, as described in detail hereinafter, may also be utilized in conjunction with a center pivot system employing a boom guidance apparatus of the kind disclosed in the aforementioned Seckler et al. U.S. Pat. No. 3,802,627 or the control described in Kircher et al. U.S. Pat. No. 3,797,517, or virtually any other guidance apparatus for the auxiliary conduit assembly 30, regardless of whether the auxiliary conduit is of cantilever construction or employs a separate support tower as illustrated in FIGS. 1 and 2.

In irrigating the corner of a rectangular field, if it is assumed that the auxiliary conduit assembly 30 extends counterclockwise from the main conduit assembly 20 and that the main conduit assembly is rotating in a clockwise or "forward" direction (FIG. 3), system 10 approaches the corner with the two conduit assemblies aligned as indicated by elements 20A and 30A in FIG. 3. This is the tuck position for the auxiliary conduit assembly, with that assembly at a minimum angle B with respect to the main conduit assembly. This angle, designated $B_{min}$ in FIG. 3, is usually approximately 90°.

As the main conduit assembly 20 continues its movement toward the corner of the field, boom 30 begins to swing outwardly from the end of the main conduit assembly 20, enlarging angle B. The maximum $B_{max}$ for the angle B is attained at or slightly beyond an orientation of 45° for the main conduit assembly; see FIG. 3, orientation 20X. This is the fully extended position for boom 30; the angle $B_{max}$ is preferably somewhat less than 180°, usually about 160°.

As the main conduit assembly 20 moves from the position 20B to the position 20C (FIG. 3), the angle at joint 40 changes from B1 to B2 as the auxiliary conduit assembly 30 traverses the cross-hatched sector 81 between its positions 30B and 30C. As system 10 leaves the corner area, it passes through the alignments 20D,30D and 20E,30E. For the alignment 20D,30D, the angle at joint 40 is again equal to the angle B2. When the orientation 20E,30E, is reached, the angle is again equal to the angle B1. During this movement, the sector 82 is irrigated by water from the auxiliary conduit assembly 30.

As is clearly apparent in FIG. 3, the two sectors 81 and 82 irrigated by the auxiliary conduit assembly 30 during transition between the two angles B1 and B2 are substantially different; the area of sector 81 is much larger than for sector 82. This illustrates the substantial difference between the water volume requirements for swing-out movements and swing-in movements of boom 30. Unless provisions are made for effective regulation of the water output of the auxiliary conduit assembly 30, for these two different conditions, sector 81 will receive substantially less water per unit area than sector 82 and neither of the two sectors is likely to be kept in balance with the irrigation effected by the main conduit assembly 20 within line 50. That is, an effective water balance for those portions of the field irrigated by boom 30 will not be maintained.

The water balance problem described above in connection with FIG. 3 also occurs in relation to movements of the auxiliary conduit assembly 30, relative to the main conduit assembly 20, in avoiding obstructions. As shown in FIG. 4, the angle B3 between the auxiliary conduit assembly 30 and the main conduit assembly 20 may be the same for the two positions 20F,30F, and 20I,30I, whereas the angle B4 may be attained at the two system orientations 20G,30G, and 20H,30H. However, the sector 83 irrigated by boom 30 in moving between positions 30F and 30G is substantially larger than the area 84 irrigated by the boom as it moves between positions 30H and 30I.

To afford an effective water balance throughout the area covered by boom 30, the present invention provides sensing means for sensing movements of the boom, within the range defined by the minimum tuck angle $B_{min}$ and the maximum extension angle $B_{max}$. In sensing this movement, the sensing means inherently affords a measure of the variations in the radial distance R (FIGS. 3 and 4) between the arc 50 described by the outer end of the main conduit assembly and the path 51 followed by the outer end of the auxiliary conduit assembly 30. In accordance with the invention, the sensing means is employed to actuate a primary control that regulates the rate of water discharge from the nozzles 33, 34 and 35 and of the auxiliary conduit assembly 30 (FIG. 1), in accordance with the position of the auxiliary conduit assembly 30 within this range $B_{min} - B_{max}$ ($R_{min} - R_{max}$).

In addition, to afford a more accurate water balance, provision is made for actuation of a secondary control means, by the sensing means, that regulates the rate of water discharge from the nozzles 33, 34 and 35 of the auxiliary conduit assembly 30 in accordance with the direction of relative movement of boom 30 within its operating range. That is, whenever the auxiliary conduit assembly 30 swings out, away from its minimum tuck position and toward its maximum extended position, as in the movement from alignment 20B, 30B to orientation 20C, 30C (FIG. 3), the rate at which water discharge is increased is programmed differently from the rate at which water discharge is decreased when the boom moves from orientation 20D, 30D to position 20E, 30E, even though the same angular change (between angles B1 and B2) occurs. In this way, the differential between the areas of sectors 81 and 82 is compensated and an overall water balance is maintained.

The same technique is applied in the situation illustrated in FIG. 4 with the system moving through the positions 20F, 30F through 20I, 30I, to compensate for the changes in area covered by boom 30, for a given change in the angle B, that occurs as the result of a reversal in the direction of angular movement of the auxiliary conduit assembly 30 within its overall range. That is, the water balance compensation for sectors 83 and 84 is effected in the same manner as in relation to the areas 81 and 82 of FIG. 3.

Figures 5, 6:
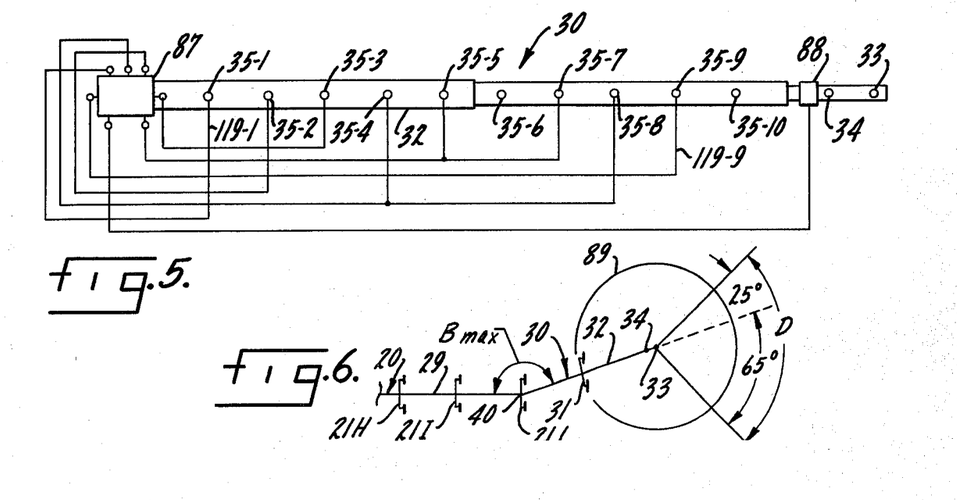
FIG. 5 is a detail plan view of the auxiliary conduit assembly of the irrigation system of FIGS. 1–4, including a schematic illustration of a part of the water balance control of the present invention.
FIG. 6 is a partial schematic plan view illustrating the preferred pattern covered by the end guns of the corner pivot irrigation system of FIGS. 1–5.

FIG. 5 illustrates an exemplary construction that may be employed for the auxiliary water conduit 32. The illustrated construction provides a total of 10 discharge nozzles 35, numbered 35-1 through 35-10, located at spaced intervals along conduit 32. Two of these sprinklers, nozzles 35-6 and 35-10, are of standard construction and remain open whenever the irrigation system 10 is in operation. The remaining nozzles 35-1 through 35-5 and 35-7 through 35-9, however, are each equipped with a control valve actuated by a valve control unit 87. The two end guns 33 and 34 are positioned at the outer end of the auxiliary conduit 32. The end guns themselves remain open at all times. However, a valve 88 is interposed in the connection between the end guns and the remainder of conduit 32. Valve 88 is actuated by the valve control unit 87.

For forward movement of the auxiliary conduit assembly 30 (see FIGS. 3 and 4), utilizing an auxiliary conduit 32 having an overall length of about 255 feet, one practical and effective sequence for operation of the nozzles and end guns of conduit 32, as illustrated in FIG. 5 is:

TABLE I

FORWARD MODE SEQUENCING

| Boom 30 Swinging Out | | | Boom 30 Swinging In | |
|---|---|---|---|---|
| Nozzle On* | Distance R (feet) | Sequence | Distance R (feet) | Nozzle Off* |
| 35-3 | 35 | First | 235-Variable | End Guns |
| 35-5; 35-7 | 45 | Second | 230 | 35-1 |
| 35-9 | 75 | Third | 215 | 35-4; 35-8 |
| 35-2 | 90 | Fourth | 210 | 35-2 |
| 35-4; 35-8 | 110 | Fifth | 160 | 35-9 |
| 35-1 | 125 | Sixth | 135 | 35-5; 35-7 |
| End Guns | 130-Variable | Last | 60 | 35-3 |

*Nozzles 35-6 and 35-10 are on continuously.

This sequence is controlled by the valve control unit 87. The reason a variable displacement is indicated for the end guns 33 and 34, in Table I, is that the opening of the valve 88 that controls the two end guns must require adjustment to preclude discharging water onto obstructions, such as the obstructions 53 in FIG. 2, or onto any road or the like situated immediately adjacent the periphery of the field being irrigated.

Referring again to FIGS. 3 and 4, it is seen that the water balance differential, relative to swing-out or swing-in movement of the auxiliary conduit assembly 30, is reversed if the direction of rotation of the main conduit assembly 20 is in a "reverse" direction, the counterclockwise direction in FIGS. 3 and 4. For this reverse mode of operation, the sequencing for the nozzles 35 and the end guns 33 and 34 of the auxiliary conduit 32 illustrated in FIG. 5 is:

TABLE II

REVERSE MODE SEQUENCING

| Boom 30 Swinging Out | | | Boom 30 Swinging In | |
|---|---|---|---|---|
| Nozzle On* | Distance R | Sequence | Distance R | Nozzle Off* |
| 35-3 | 60 | First | 130-Variable | End Guns |
| 35-5; 35-7 | 135 | Second | 125 | 35-1 |
| 35-9 | 160 | Third | 110 | 35-4; 35-8 |
| 35-2 | 210 | Fourth | 90 | 35-2 |
| 35-4; 35-8 | 215 | Fifth | 75 | 35-9 |
| 35-1 | 230 | Sixth | 45 | 35-5; 35-7 |
| End Guns | 235-Variable | Last | 35 | 35-3 |

*Nozzles 35-6 and 35-10 are on continuously.

The designation of forward and reverse directions, in the foregoing description, is quite arbitrary, and is dependent upon whether the boom 30 extends to the left of the main conduit assembly 20, as shown in the drawings, or in the opposite direction to the right of the main conduit assembly. If this relationship is reversed, the designation of the forward and reverse directions must also be reversed.

The irrigation pattern of the two end guns 33 and 34 is illustrated schematically in FIG. 6. As shown therein, gun 33 covers a limited arc D (approximately 90°) with the major portion of the arc oriented ahead of the outer end of auxiliary conduit assembly 30, assuming that the system is moving in a forward direction. The other gun 34 covers a complete circular sector 89. However, other end gun arrangements can be utilized as desired, depending in part upon the number and spacing of the discharge nozzles along the remaining length of boom 30.

Figure 7:
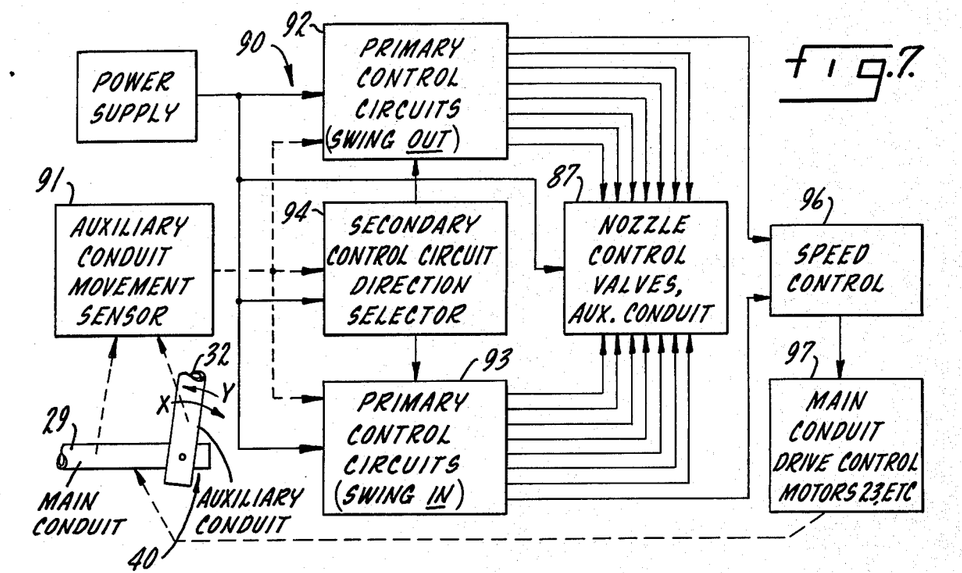
FIG. 7 is a simplified block diagram of a water balance control constructed in accordance with one embodiment of the present invention.

FIG. 7 affords a block diagram of a water balance control 90 constructed in accordance with one embodiment of the present invention. The water balance control 90 comprises an auxiliary conduit movement sensor 91 that is mechanically connected to the main conduit 29 and to the auxiliary conduit 32. Sensor 91 has an output connection to a plurality of primary control circuits 92 that are utilized to control operation of the discharge nozzles of conduit 32 whenever the auxiliary conduit is pivoted outwardly of the main conduit (arrow X). Sensor 91 also has an output connection to another primary control circuit unit 93 that incorporates control circuits for regulating the output of the boom nozzles whenever the auxiliary conduit 32 swings inwardly toward the main conduit 29 (arrow Y).

The swing-out control unit 92 may comprise as many individual control circuits as there are discharge nozzles on the auxiliary conduit 32 (see FIG. 5). For the present example, however, there are a total of seven individual nozzle control circuits. These include one control circuit for each of the nozzles 35-1, 35-2, 35-3, and 35-9, plus one for valve 88 controlling the end guns 33 and 34. Of the two remaining control circuits, one actuates the nozzles 35-4 and 35-8, while the other controls the nozzles 35-5 and 35-7. Thus, the control circuits in unit 92 are correlated with the control elements of the nozzle control valve unit 87.

The other primary control circuit unit, swing-in unit 93, includes a plurality of individual control circuits, corresponding in number to those in unit 92, all of which are connected to the nozzle valve control unit 87.

The water balance control 90 of FIG. 7 further comprises a secondary control circuit 94 linked to sensor 91. Device 94 determines the direction in which the auxiliary conduit 32 is moving, or has last moved, with respect to the main conduit 29, either a swing-out movement (arrow X) or a swing-in movement (arrow Y). The secondary control circuit 94 is connected to each of the two primary control circuit units 92 and 93. When the auxiliary conduit 32 swings out, the direction selector control circuit 94 actuates the primary control circuits of unit 92 so that those circuits in turn can actuate the nozzle control valve unit 87 to regulate water discharge from auxiliary conduit 32. Conversely, when the auxiliary conduit swings in toward the main conduit (arrow X), the direction selector control 94 actuates the primary control circuits 93 to maintain control of the nozzle control valves of unit 87. In this manner, the secondary control circuit 94 is employed to regulate the water discharge from the auxiliary conduit nozzles in accordance with the direction of relative movement of the auxiliary conduit assembly 30 within its range between the angles $B_{min} - B_{max}$, corresponding to the radial distance range $R_{min} - R_{max}$ (FIG. 3).

The water balance control 90 of FIG. 7 also includes a speed control unit 96 having two inputs, one input from each of the primary control circuit units 92 and 93. Speed control 96 is in turn connected to a main conduit drive control 97 that regulates the speed of rotation of the main conduit assembly 20. Speed control 96 may comprise a conventional adjustable duty cycle timer. If the main conduit drive control 97 includes a duty cycle (percent) timer, the two timers are connected in series. Speed control 96 is utilized to reduce the speed of the main conduit assembly 20 whenever the boom 30 has been extended outwardly to a predetermined extent, as described more fully hereinafter.

Figure 8:
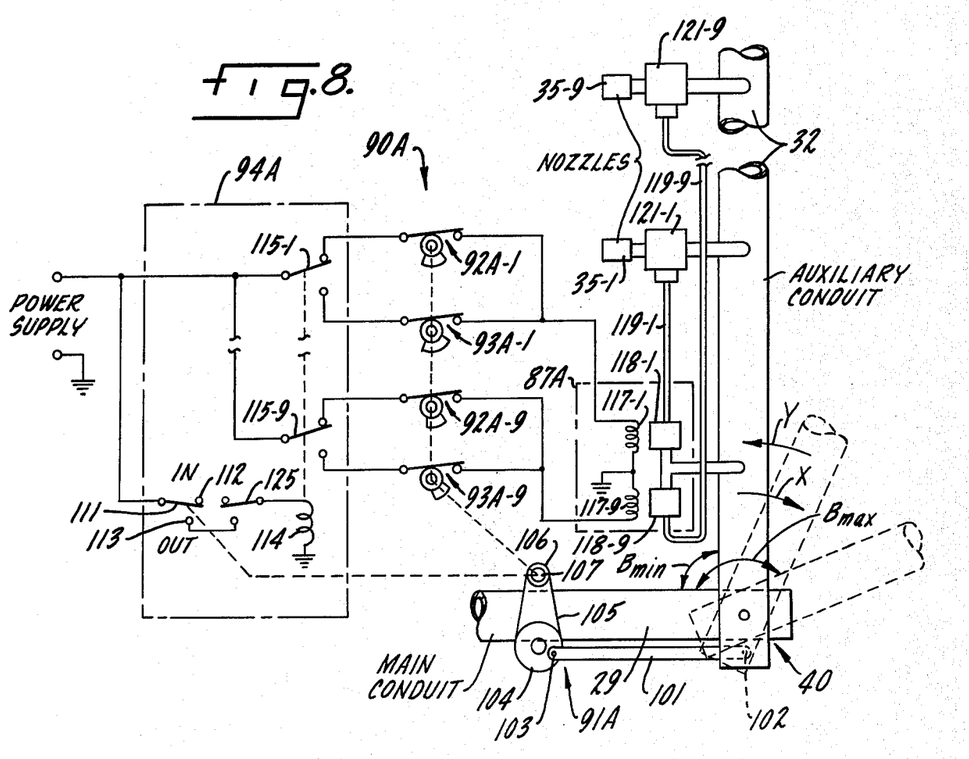
FIG. 8 is a schematic illustration of one form of apparatus that may be utilized to implement the water balance control in FIG. 7.

FIG. 8 affords a simplified schematic diagram of one kind of apparatus that may be utilized in implementation of the water balance control 90 illustrated in FIG. 7. The water balance control 90A illustrated in FIG. 8 comprises an auxiliary conduit movement sensor 91A including a rod 101 having one end 102 pivotally connected to the auxiliary conduit 32 at joint 40. The other end 103 of rod 101 is pivotally connected to a drive sprocket 104. A drive chain or gear belt 105 engages sprocket 104 and also engages a driven sprocket 106 mounted upon a shaft 107. Thus, the angular position of shaft 107, at any given time, is indicative of the angular position of auxiliary conduit 32 relative to main conduit 29. Further, the direction in which shaft 107 rotates, at any given time, is indicative of the direction of movement of the auxiliary conduit with respect to the main conduit, either swinging in or swinging out.

The secondary control circuit or direction selector 94A illustrated in FIG. 8 comprises a single-pole double-throw sensor switch 111 that is mechanically connected to shaft 107. The preferred form of mechanical connection is a friction clutch, such as described in connection with FIG. 9. Switch 111 has a normally open terminal 112 and a normally closed terminal 113. The normally open terminal 112 is connected to the operating coil 114 of a relay comprising a plurality of single-pole double-throw contacts; only two of the relay contacts, 115-1 and 115-9, are illustrated.

The normally closed terminal of relay contact 115-1 is connected to a cam actuated switch 92A-1 that constitutes one of the primary control circuits for swing-out operation of the auxiliary conduit 32 (see FIG. 7). The normally open side of contact 115-1 is connected to a similar cam actuated switch 93A-1. The two switches 92A-1 and 93A-1 are each connected to the solenoid 117-1 of a solenoid-operated pilot valve 118-1. Solenoid 117-1 and valve 118-1 are both part of the nozzle control valve unit 87A for the water balance control 90A.

The normally closed terminal of relay contact 115-9 is connected to a cam actuated switch 92A-9 that is in turn connected to a solenoid 117-9 in unit 87A. Solenoid 117-9 is employed to actuate a pilot valve 118-9. The normally open side of contact 115-9 is connected to a cam actuated switch 93A-9 that is also connected to solenoid 117-9. The common terminals of relay contacts 115-1 through 115-9 are connected to a suitable power supply.

Each of the two pilot valves 118-1 and 118-9 has an inlet port connected to auxiliary conduit 32. The outlet port of valve 118-1 is connected by a tube 119-1 to a hydraulically actuated valve 121-1 that is interposed in the connection between nozzle 35-1 and auxiliary conduit 32. Similarly, the outlet port of valve 118-9 is connected by a tube 119-9 to a hydraulic pilot actuated valve 121-9 interposed between conduit 32 and nozzle 35-9. By comparing FIGS. 5 and 8, the pattern of control connections for all of the nozzles on auxiliary conduit 32 can be ascertained.

All of the cam actuated primary control switches 92A-1 through 92A-9 and 93A-1 through 93A-9 (FIG. 8) are mechanically connected to shaft 107 of the auxiliary conduit movement sensor 91A. In the preferred construction illustrated in FIGS. 9 and 10, the cams for actuating the switches are mounted directly upon shaft 107. Thus, by adjusting the cams, these control switches can be made to open and close in direct relationship to desired angular orientations of shaft 107, which are representative of the angular orientation of auxiliary conduit 32 relative to main conduit 29.

In considering the operation of water balance control 90A (FIG. 8), it may first be assumed that the auxiliary conduit 32 is moving outwardly of the main conduit 29 (arrow X). Under these conditions, switch 111 remains in the illustrated position and the relay operating coil 114 remains unenergized so that relay contacts 115-1 and 115-9 are in the positions shown. As the auxiliary conduit continues its swing-out movement, shaft 107 rotates to reflect that movement. Switch 111 does not change, but remains in the position shown.

Assuming that the water balance control 90A has been adjusted to operate in accordance with the sequence set forth in Table I, and that the system is operating in the forward mode, switch 92A-9 is opened by its associated cam when the auxiliary conduit has moved far enough outwardly so that the distance R (see FIG. 3) is 75 feet. This de-energizes solenoid 117-9, closing valve 118-9 and interrupting the supply of water under pressure through tube 119-9. This opens valve 121-9 and turns on discharge nozzle 35-9. Later, as the auxiliary conduit continues its outward swinging movement, switch 92A-1 is opened when the distance R is approximately one hundred twenty-five feet (see Table I). As a consequence, solenoid 117-1 is de-energized, closing valve 118-1 and interrupting the supply of water through tube 119-1 to valve 121-1. This opens valve 121-1 and initiates a discharge from nozzle 35-1. Similar circuits, which have not been illustrated in FIG. 8, actuate the other nozzles of the boom 30 in accordance with a complete swing-out sequence set forth in Table I.

During a normal swing-out movement of auxiliary conduit 30 to its full extended position, the swing-in control switches 93A-1 through 93A-9 all open. The angular orientations at which they open are not critical for swing-out movement, however, since these switches are all effectively disconnected at the relay contacts 115-1 through 115-9 during the swing-out operation.

When boom 30 starts to swing back in (arrow Y), the friction clutch connection from shaft 107 to switch 111 actuates the switch and completes an energizing circuit for relay coil 114. As a consequence, each of the relay contacts 115-1 through 115-9 is actuated from its normally closed position to its normally open position, so that power supply connections to solenoids 117-1 through 117-9 must now be made through control switches 93A-1 through 93A-9 instead of switches 92A-1 through 92A-9.

With the auxiliary conduit swinging in, it is necessary to reduce the rate of water discharge more rapidly than that discharge rate was increased during swing-out operation, for the reasons discussed above in connection with FIGS. 3 and 4. Consequently, and in accordance with the sequence of Table I, when the inward swinging movement of auxiliary conduit 32 reaches a point at which the radial distance R is 230 feet, switch 93A-1, which has previously been open, closes. This restores the energizing circuit for solenoid 117-1 and opens valve 118-1 so that its output to valve 121-1 is restored. As a consequence, valve 121-1 closes and nozzle 35-1 is shut off. Similarly, when the boom has swung inwardly to a point at which the distance R is approximately 160 feet, switch 93A-9 closes to energize solenoid 117-9. This opens pilot valve 118-9, restoring the hydraulic circuit to valve 121-9 and closing that valve to shut off nozzle 35-9. In this manner, the complete sequence of Table I can be carried out.

The foregoing description of operation of water balance control 90A, FIG. 8, has been based upon the assumption that the main conduit assembly 20 has been rotated in the forward direction (FIGS. 3 and 4) with the auxiliary conduit assembly 30 trailing behind the main conduit assembly 20. For operation with the main conduit assembly rotating in the reverse direction, pushing the boom ahead of it, it is necessary to utilize the reverse mode sequence of Table II. This is accomplished, without changing any of the cams for the control switches 92A-1 through 92A-9 or 93A-1 through 93A-9, with a simple electrical change in the secondary control, the direction selector 94A. Thus, to change from the forward sequence of Table I to the reverse sequence of Table II in accordance with a change in the direction of rotation of the main conduit assembly, the connection of the relay coil 114 is changed from contact 112 to contact 113 of switch 111, as by means of a reversing switch 125. This single simple change, without more, prepares the system for operation in the reverse mode.

The control circuits for speed control 96 (FIG. 7) can be duplicates of the circuits described for the auxiliary conduit nozzles, and hence have not been illustrated in FIG. 7. In one commercial embodiment of the water balance control of the invention, the sequence control for speed unit 96 is actuated by the same circuits that control nozzle 35-9.

Figure 9:
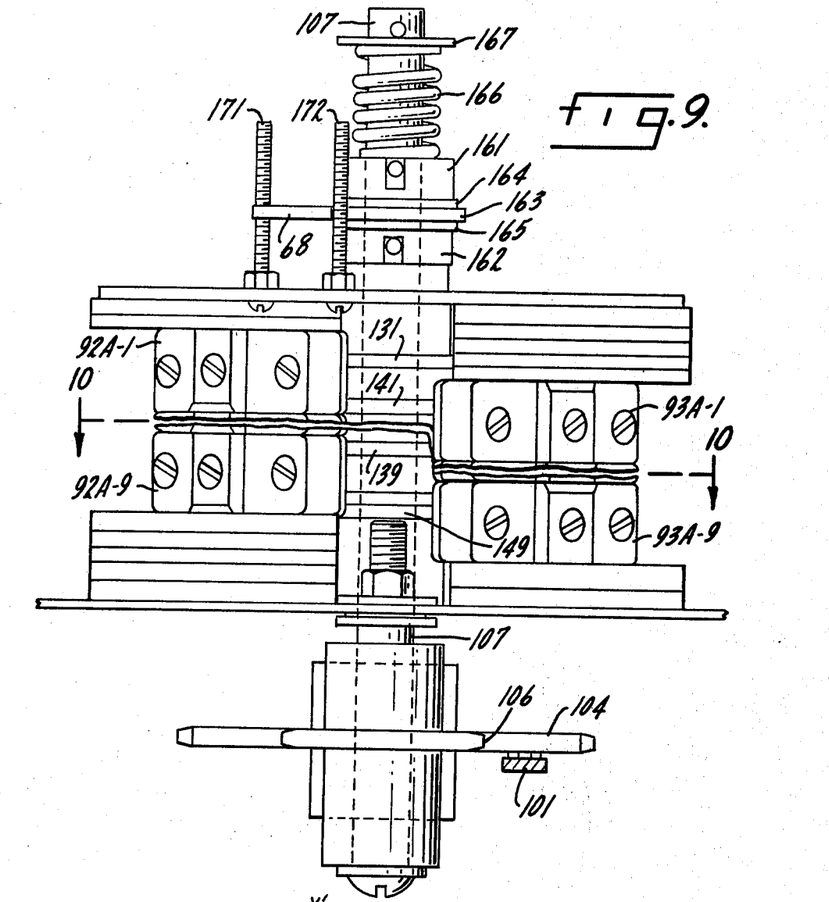
FIG. 9 is a detail elevation view illustrating the principal components of the electrical controls shown in FIG. 8.
Figure 10:
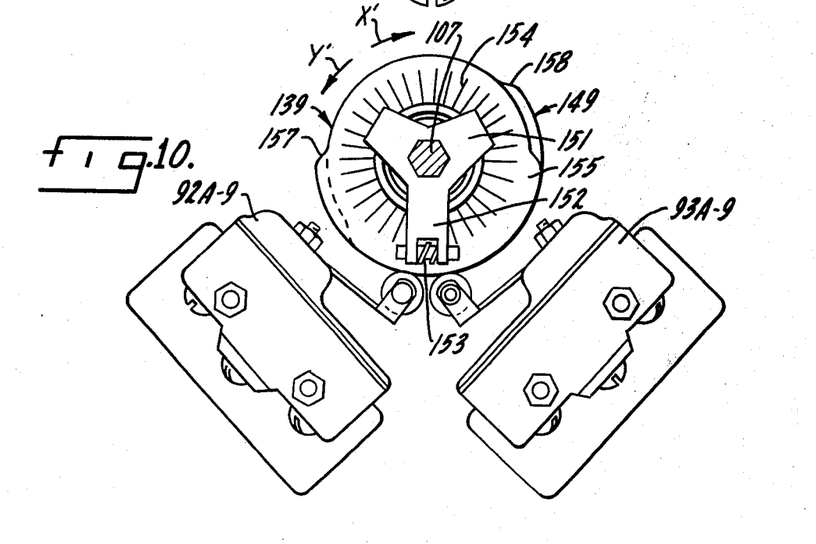
FIG. 10 is a simplified sectional view taken approximately along line 10–10 in FIG. 9.

FIGS. 9 and 10 illustrate one physical construction that can be utilized for the movement sensor 91A, for the direction sensing switch 111 of the secondary control circuit 94A, and for the primary control switches 92A-1 through 92A-9 and 93A-1 through 93A-9 in the water balance control 90A of FIG. 8. FIG. 9 shows the drive sprocket 104 that is connected to the rod 101, in its relation to the driven sprocket 106 affixed to shaft 107. As noted above, the arrangement is such that the direction of angular movement of shaft 107 reflects the direction of angular movement of the auxiliary conduit relative to the main conduit and the angular displacement of shaft 107 corresponds to the angular displacement of the two conduits relative to each other. The mechanical advantage afforded by the large sprocket 104 driving the small sprocket 106 is employed merely to increase the overall angular movement of the shaft 107 for the total range $B_{min}$–$B_{max}$.

The primary control switches for swing-out movement of the auxiliary conduit, switches 92A-1 through 92A-9, are mounted in a vertical stack at one side of shaft 107. The primary control switches 93A-1 through 93A-9 for swing-in movement of the auxiliary conduit are mounted in another vertical stack adjacent shaft 107. The angular orientation of the two stacks of switches is shown in FIG. 10. The two stacks of switches are vertically staggered by a small distance, as illustrated in FIG. 9.

For switch 92A-1, an adjustable cam 131 is mounted upon shaft 107. A similar cam 141 on shaft 107 actuates switch 93A-1. Similarly, an adjustable cam 139 on shaft 107 is employed to actuate switch 92A-9 and another adjustable cam 149 on that shaft actuates switch 93A-9.

As shown in FIG. 10, a typical cam 139 comprises a core element 151 affixed to shaft 107 for rotation therewith. Core 151 includes an arm 152 on which a small worm member 153 is mounted. The worm 153 engages a series of gear slots 154 formed in the face of the cam body 155. The adjustable cam 149 is of similar construction. It is thus seen that the two cams can be adjusted relative to each other so that the transition point 157 on cam 139 that actuates switch 92A-9 can be adjusted independently of the location of the transition point 158 on cam 149 that actuates switch 93A-9.

At the upper end of shaft 107, FIG. 9, two bushings 161 and 162 are mounted on shaft 107, the mounting arrangement employed being one which permits axial movement of the bushings but compels the bushings to rotate with rotation of shaft 107. A cam member 163 is mounted on shaft 107 intermediate the bushings 161 and 162 and two friction members 164 and 165, which may be fiber washers, are interposed between cam 163 and bushings 161 and 162, respectively. A spring 166 on shaft 107, extending axially between bushing 161 and a washer 167, biases bushing 161 downwardly, affording a frictional coupling between shaft 107 and cam 163 through the two bushings 161 and 162 and the friction members 164 and 165.

Cam 163 has an arm 168 which projects outwardly between two posts 171, and 172, limiting the rotational movement of cam 163. For this construction, the sensing switch 111 comprises another small switch that is positioned adjacent cam 163 to be actuated by that cam; the switch has been omitted in FIG. 9 for clarity of illustration.

The operation of the primary control switches 92A-1 through 92A-9 and 93A-1 through 93A-9 will be evident from FIGS. 9 and 10 and requires no explanation. With respect to the selector switch actuated by cam 163, it can be seen that when the shaft 107 rotates in a clockwise direction (arrow X' in FIG. 10), arm 168 engages post 161. With the cam in that position, effected in response to swing-out movement of auxiliary conduit 32, the switch 111 actuated by cam 163 is held open, as shown in FIG. 8. Conversely, when shaft 107 rotates in a counterclockwise direction (arrow Y') arm 168 comes to rest against post 172. For this position of arm 168, and cam 163, switch 111 is closed upon its contact 112 (FIG. 8) to indicate that the auxiliary conduit is moving in a swing-in direction. The transition point on cam 163, for opening and closing its associates switch, is preferably adjusted to engage the switch cam follower when the arm 168 is mid-way between posts 171 and 172.

The primary control circuits for the speed control device 96 (FIG. 7) may be of the same construction as for the discharge nozzles. Thus, in a circuit like that of FIGS. 8–10, an additional pair of cam switches associated with shaft 107 may be employed to actuate the speed control, slowing down the rotational movement of the main conduit assembly 20 when boom 30 is extended and a substantial number of the extension discharge nozzles are operational. Actuation is usually correlated with positioning of the auxiliary conduit assembly beyond the mid-point of its range $B_{min}-B_{max}$. In one commercial arrangement, using the nozzle sequences of Tables I and II, the speed control device 96 is actuated on and off in coincidence with actuation of nozzle 35-9, utilizing the primary control switches 92A-9 and 93A-9.

Speed control 96 would be unnecessary if irrigation system were connected to a water source 11 affording a constant head at any and all system discharge rates. Ordinarily, however, such a constant-head water supply is unavailable. For most water pumps, the effective head decreases as a function of increased system discharge rate; accordingly, when the nozzles of the auxiliary extension assembly are open, the discharge rate from the main conduit assembly is reduced, necessitating a slowdown of the main conduit assembly if a reasonable water balance is to be maintained in the central area 50 (FIGS. 2–4).

The main conduit drive control 97 (FIG. 7) ordinarily includes a primary duty cycle (percent) timer than controls the rotational speed of the main conduit assembly 20 by varying the duty cycle for the end tower motor 23J; the period of revolution for the main conduit assembly may vary from as low as ten hours to as much as one week. In a system of this kind, the speed control 96 may comprise a secondary duty cycle timer connected in series with the primary timer. To determine the setting of the secondary duty cycle timer, the highest pressure head $P_H$ at joint 40 is measured with all valve-controlled auxiliary conduit discharge nozzles shut off, and the lowest pressure head $P_L$ at joint 40 is measured with all nozzles open. The percent duty cycle T is then determined in accordance with the relation 1. $T = \sqrt{P_L/P_H}$ or the closely equivalent relation

2. $T = 1 - P_H - P_L/2\ P_H$

Thus, for example, if $P_H = 75$ psi and $P_L = 60$ psi, the duty cycle setting for speed control 96 is 89.5% by relation (1) or 90% by relation (2). Once this setting has been established, it may remain unchanged. Adjustments for depth of coverage made at the main duty cycle timer in drive control 97 are effectively applied to the entire area covered by system 10.

For effective use of a particular sequencing program (e.g., the program of Tables I and II), it is necessary to calibrate the primary control circuits 92A and 93A (FIG. 8) in accordance with the length of the main conduit assembly 20, since the radial distance R varies, relative to the measured angle B1 when the main conduit length is changed. This can be readily accomplished for all standard lengths of the main conduit assembly, the calibration being effected by adjustment of the cams that actuates the primary control switches. An effective sequencing program for any given construction for boom 30 (length of auxiliary conduit 32, number and spacing of nozzles 35 and end guns, angular range $B_{min}-B_{max}$, etc.) is best determined on an empirical basis, although mathematical formulations can be employed in evaluating the many variables involved. The program of Tables I and II applies to an auxiliary conduit having a total length of about 255 feet with a spacing of about 25 feet between nozzles 35 (see FIG. 5).

In the specific embodiment of FIGS. 8–10, a particular combination of mechanical, electrical and hydraulic control elements is employed. It will be recognized that other combinations may be substituted; for example, the solenoids 117-1 through 117-9 could actuate the valves 121-1 through 121-9 directly, without using the intervening hydraulic pilot valves 118-1 through 118-9. The specific controls described operate to actuate the auxiliary conduit discharge nozzles on or off, with no intervening settings. This mode of control is preferred. However, throttling controls employing variable-orifice discharge nozzles may be utilized if desired, and a similar continuous speed control can also be employed instead of the described step speed control.

We claim:

1. A water balance control for a center pivot irrigation system of the kind including an elongated main conduit assembly having an inner end pivotally connected to a water source at a central pivot point and having a plurality of discharge nozzles at spaced intervals along its length, main drive means for moving the main conduit assembly around the pivot point to irrigate a primary field area of circular configuration, an elongated auxiliary conduit assembly having an inner end connected to and movable with the outer end of the main conduit assembly and having a series of discharge nozzles at spaced intervals along its length, and auxiliary drive means for moving the auxiliary conduit assembly over a range between a fully retracted position and a fully extended position, relative to the main conduit assembly, to irrigate at least one secondary field area beyond the periphery of the primary field area, the water balance control comprising:

sensing means for sensing movement of the auxiliary conduit assembly, within its range, relative to the outer end of the main conduit assembly;

and primary control means, actuated by the sensing means, for regulating the rate of water discharge from the auxiliary conduit in accordance with the position of the auxiliary conduit assembly within its range of movement.

2. A water balance control for a center-pivot irrigation system, according to claim 1, in which the primary control means comprises a plurality of flow control valves, each interposed between the auxiliary conduit and one of the discharge nozzles, and a corresponding plurality of valve actuators for actuating each flow control valve, independently of other flow control valves, between a maximum flow condition and a minimum flow condition, in accordance with the position of the auxiliary conduit assembly within its range of movement.

3. A water balance control for a center pivot irrigation system, according to claim 2, in which each flow control valve is electrically actuated, in which each valve actuator comprises a cam-operated electrical switch, and in which the sensing means comprises a cam shaft, a plurality of valve actuator cams mounted on the cam shaft and individually associated with respective ones of the valve actuator switches, and a mechanical linkage interconnecting the main conduit assembly and the auxiliary conduit assembly with the cam shaft to rotate the cam shaft in accordance with movements of the auxiliary conduit assembly relative to the outer end of the main conduit assembly.

4. A water balance control for a center pivot irrigation system, according to claim 1, and further comprising secondary control means actuated by the sensing means, for regulating the rate of water discharge from the auxiliary conduit nozzles in accordance with the direction of relative movement of the auxiliary conduit assembly within its range.

5. A water balance control for a center pivot irrigation system, according to claim 4, in which the primary control means includes a first group of primary control circuits for swing-out movement of the auxiliary conduit assembly and a second group of primary control circuits for swing-in movement of the auxiliary conduit assembly, with the main conduit assembly rotating in a given direction, and in which the secondary control means comprises a selector switch coupled to the two groups of primary control switches to select one primary control switch group for operation at any given time.

6. A water balance control for a center pivot irrigation system, according to claim 5, in which the primary control means further comprises a plurality of electrically actuated flow control valves, each interposed between the auxiliary conduit and one of the discharge nozzles, with each flow control valve connected to one primary control circuit of each group, each flow control valve being actuated to a maximum flow condition by a primary control circuit from the first group and to a minimum flow condition by a primary control circuit from the second group, in accordance with the position of the auxiliary conduit assembly within its range of movement.

7. A water balance control for a center pivot irrigation system, according to claim 6, in which each primary control circuit comprises a cam-operated electrical valve actuator switch, and in which the sensing means comprises a cam shaft, a plurality of cams mounted on the cam shaft and individually associated with respective ones of the valve actuator switches, and a mechanical linkage interconnecting the main conduit assembly and the auxiliary conduit assembly with the cam shaft to rotate the cam shaft in accordance with movements of the auxiliary conduit assembly relative to the outer end of the main conduit assembly.

8. A water balance control for a center pivot irrigation system, according to claim 5, in which the sensing means further comprises a reversing switch for reversing the connections of the selector switch for a reversal of the direction of movement of the main conduit assembly.

9. A water balance control for a center pivot irrigation system, according to claim 1, and further comprising an auxiliary speed control, coupled to the primary control means, for regulating the angular speed of the main conduit whenever the system pressure varies significantly as a result of a varying rate of water discharge from the auxiliary conduit.

10. A water balance control for a center pivot irrigation system, according to claim 9, in which the main drive means includes a main duty cycle timer for controlling the angular speed of the main conduit assembly, in which the auxiliary speed control comprises an auxiliary duty cycle timer, and in which the primary control means connects the auxiliary duty cycle timer in series with the main duty cycle timer.

11. A water balance control for a center pivot irrigation system, according to claim 10, in which the setting of the auxiliary duty cycle timer is determined in accordance with the relation $$T = \sqrt{P_L/P_H}$$

where $T$ = percent duty cycle $P_H$ = maximum pressure head, all valve-controlled nozzles closed $P_L$ = minimum pressure head, all system nozzles open.

12. A water balance control for a center pivot irrigation system, according to claim 10, in which the setting of the auxiliary duty cycle timer is determined in accordance with the relation $$T = 1 - P_H - P_L/2\, P_H$$

where $T$ = percent duty cycle $P_H$ = maximum pressure head, all valve-controlled nozzles closed $P_L$ = minimum pressure head, all system nozzles open.

13. A water balance control for a center pivot irrigation system, according to claim 4, in which the sensing means comprises a cam shaft, a mechanical linkage interconnecting the main conduit assembly and the auxiliary conduit assembly with the cam shaft to rotate the cam shaft in accordance with movements of the auxiliary conduit assembly relative to the outer end of the main conduit assembly, and a direction sensing cam member frictionally coupled to the cam shaft for movement between two limit positions indicative of movement of the auxiliary conduit assembly in swing-in and swing-out directions, respectively, and in which the secondary control means comprises a selector device actuated by the direction sensing cam member.

14. A water balance control for a center pivot irrigation system, according to claim 13, in which each primary control circuit comprises a cam-operated control device actuated by an individual cam on the cam shaft.

15. A method of water balance control for a center pivot irrigation system of the kind including an elongated main conduit assembly having an inner end pivotally connected to a water source at a central pivot point and having a plurality of discharge nozzles at spaced intervals along its length, main drive means for moving the main conduit assembly around the pivot point to irrigate a primary field area of circular configuration, an elongated auxiliary conduit assembly having an inner end connected to and movable with the outer end of the main conduit assembly and having a series of discharge nozzles at spaced intervals along its length, and auxiliary drive means for moving the auxiliary conduit assembly over a range between a fully contracted position and a fully extended position, relative to the main conduit assembly, to irrigate at least one secondary field area beyond the periphery of the primary field area, water balance control method comprising the steps of:

sensing angular movements of the auxiliary conduit assembly, within its range, relative to the outer end of the main conduit assembly, and regulating the rate of water discharge from the auxiliary conduit nozzles in accordance with the position and direction of movement of the auxiliary conduit assembly within its range by actuating the individual discharge nozzles of the auxiliary conduit assembly between closed and maximum open conditions in accordance with two predetermined programs, one for swing-out motion and one for swing-in motion of the auxiliary conduit assembly.

16. A method of water balance control for a center pivot irrigation system, according to claim 15, including the additional step of regulating the angular speed of the main conduit assembly whenever the system pressure varies significantly as a result of a varying rate of water discharge from the auxiliary conduit.

17. A method of water balance control for a center pivot irrigation system, according to claim 16, in which the angular speed of the main conduit is reduced, whenever a given number of discharge nozzles of the auxiliary conduit assembly are open, approximately in accordance with the relation $$T = \sqrt{P_L/P_H}$$

where
$T$ = percent duty cycle for reduced angular speed
$P_L$ = minimum pressure head, all system nozzles open
$P_H$ = maximum pressure head, all valve-controlled nozzles closed.

18. A method of water balance control for a center pivot irrigation system, according to claim 15, including the additional step of reversing the programs for swing-in and swing-out motion for a reversal of direction of angular movement of the main conduit assembly.

* * * * *